United States Patent Office 3,281,357
Patented Oct. 25, 1966

3,281,357
PROCESS FOR PREPARING NITROGEN AND ALUMINUM CONTAINING COMPOSITIONS
Paul W. Vogel, Cleveland, Ohio, assignor to The Lubrizol Corporation, Wickliffe, Ohio, a corporation of Ohio
No Drawing. Filed Dec. 2, 1964, Ser. No. 415,455
14 Claims. (Cl. 252—33.6)

This invention relates to a new chemical process, to chemical compositions made therefrom, and to mineral oil compositions containing the products of this invention. More particularly, it relates to a novel class of chemical compositions which are effective dispersants and detergents for hydrocarbon oils.

One of the recurring problems in lubricating oils, caused mostly by ordinary stop-and-go driving conditions, is the contamination of the oils with foreign matter. Such foreign matter includes dirt, soot, water, blow-by products of gasoline, and degradable by-products of the lubricating oils (mostly oxidation by-products). The presence of this foreign matter is harmful to the operation of the engines. For example, it tends to corrode and erode the metal surfaces; it agglomerates to form sludge and other oil-insoluble materials which deposit on the working parts tending to clog the oil filter. Also, the presence of such foreign matter tends to further accelerate the deterioration of the lubricating oils. This problem, in part, is solved by incorporating oxidation inhibitors, detergents and dispersants into the lubricating oils.

Oxidation inhibitors prevent the formation of varnish-like coatings on the cylinder walls. The dispersants and detergents keep the foreign matter in suspension and thus prevents these foreign contaminants from depositing on the metal surfaces. Detergent containing oils are especially useful in the lubrication of engines run at high temperatures and under severe service conditions, e.g., diesel engines, where the detergent acts to keep blow-by fuel by-products in suspension in the oils so that these oil-insoluble contaminants will not be deposited and cause excessive piston varnish, ring sticking, and sludge.

It had been found that the products of the process of this invention are useful as oxidation inhibitors, dispersants and detergents in hydrocarbon oils.

It is therefore, an object of this invention to provide novel compositions of matter by a novel process.

It is also an object of this invention to provide compositions which are useful as additives in hydrocarbon oils.

It is still another object of this invention to provide a novel process for the preparation of compositions useful as dispersants, detergents, and oxidation inhibitors.

It is also an object of this invention to provide compositions which are useful as dispersants, detergents, and oxidation inhibitors in hydrocarbon compositions.

It is another object of this invention to provide improved lubricating compositions.

These and other objects of this invention are accomplished by providing a process for preparing an oil-soluble nitrogen and aluminum containing composition comprising (A) preparing an acylated amine by mixing, at a temperature within the range of from about 50° C. to about 300° C.,
    (1) one equivalent of a succinic compound selected from the class consisting of hydrocarbon-substituted succinic acids and hydrocarbon-substituted succinic anhydrides wherein the hydrocarbon substituent has at least about 50 aliphatic carbon atoms, with
    (2) at least about 1.2 equivalent of an amine selected from the class consisting of alkylene polyamines and hydroxy alkyl-substituted alkylene polyamines,
and removing the water formed thereby, and then
(B) mixing the acylated amine with at least about 0.6 equivalent of an aluminum oxy compound having the structural formula

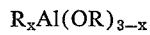

$$R_xAl(OR)_{3-x}$$

wherein R is a radical having from about 2 to about 12 carbon atoms and is selected from the class consisting of alkyl and aryl and $x$ is a number from 0 to 2, and heating the resulting mixture at a temperature within the range of from about 50° C. to about 300° C.

The products of the process of this invention are useful as oxidation inhibitors, dispersants and detergents in hydrocarbon oils. They are also useful with other additives known in the lubricating field.

The hydrocarbon-substituted succinic compounds are readily obtained from the reaction of maleic anhydride or maleic acid with a high molecular weight olefin polymer or a chlorinated hydrocarbon or other high molecular weight hydrocarbon containing an activating polar substituent, i.e., a substituent which is capable of activating the hydrocarbon molecule with respect to the reaction with maleic anhydride or the acid thereof. Said reaction involves heating equivalent amounts of the olefin polymer or chlorinated hydrocarbon and maleic anhydride or maleic acid, for example, at a temperature within the range of from about 100° C. to about 200° C. The resulting product is a hydrocarbon-substituted succinic anhydride or the succinic acid, depending upon which of the two maleic compounds are used. The succinic anhydride may be hydrolzed to the corresponding acid by treatment with water or steam. The hydrocarbon-substituted succinic anhydride is preferred for the purposes of this invention.

The principal sources of the hydrocarbon-substituted radical include the high molecular weight petroleum fractions and olefin polymers, particularly polymers of mono-olefins having from 2 to about 30 carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, are likewise useful. Examples of such medial olefins include 2-butene, 3-pentene, and 4-octene.

Also useful are the interpolymers of the above mono or medial olefins with interpolymerizable olefinic substances such as aromatic olefins, cyclic olefins, and poly-olefins. Such interpolymers include, for example, those prepared by polymerizing isobutene with styrene, isobutene with butadiene, propene with isoprene, ethylene with piperylene, isobutene with chloroprene, isobutene with p-methyl styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, and isobutene with styrene and piperylene.

Specific examples of such interpolymers useful in this invention include the following (percent by weight): copolymer of 95% of isobutene with 5% of styrene, terpolymer of 98% of isobutene with 1% of piperylene and 1% of chloroprene, terpolymer of 95% of isobutene with 2% of 1-butene and 3% of 1-hexene, terpolymer of 60% of isobutene with 20% of 1-pentene and 20% of 1-octene, copolymer of 80% of 1-hexene and 20% of 1-heptene, terpolymer of 90% of isobutene with 2% of cychlohexene and 8% of propene, and copolymer of 80% of ethylene and 20% of propene.

The relative proportions of the mono-olefins to the other monomers in the interpolymers influence the stability and oil-solubility of the products of this invention. Thus, the interpolymers contemplated for use in this invention should be substantially aliphatic and substantially saturated, i.e., they should contain at least about 80%, and preferably at least about 95%, on a weight basis, of units derived from the aliphatic mono-olefins and no more than about 5% of olefinic linkages based on the total number of carbon-to-carbon covalent linkages. The saturation limitation applies also to the polymers derived from mono olefins and medial olefins. An excessive porportion of unsaturated linkages renders the molecule susceptible to oxidation, deterioration, and further polymerization resulting in products unsuitable for use in hydrocarbon oils in many applications. In most instances, the percent of olefinic linkages should be less than about 2% of the total number of carbon-to-carbon covalent linkages.

Another source of the hydrocarbon substituent radicals includes saturated aliphatic hydrocarbons derived from highly refined high molecular weight white oils or synthetic alkanes such as are obtained by hydrogenation of the high molecular weight olefin polymers illustrated above.

In addition to the pure hydrocarbon substituents described above, it is intended that the term "hydrocarbon substituent," as used in the specification and claims, include substantially hydrocarbon substituents. For example, the hydrocarbon substituent may contain polar substituents provided, however, that the polar substituents are not present in proportions sufficiently large as to alter significantly the hydrocarbon character of the radical. The polar substituents contemplated are those exemplified by chloro, bromo, keto, aldehydo, ethereal, and nitro, etc. Examples of such polar-substituted hydrocarbons include propylene sulfide, di-polyisobutene disulfide, nitrated mineral oil, di-polyethylene sulfide, and brominated polyethylene. The upper limit with respect to the proportion of such polar substituents in the radical is approximately 10% based on the weight of the hydrocarbon portion of the radical.

The size of the hydrocarbon substituent of the succinic compounds appears to determine the effectiveness of the additives of this invention as detergents in lubricating oils. It is critically important that said substituent be large, that is, that it have at least about 50 aliphatic carbon atoms in its structure. The molecular weight of the hydrocarbon substituent should be within the range of from about 700 to about 100,000. Olefin polymers having a molecular weight of from about 750 to 5,000 are preferred. However, higher molecular weight olefin polymers having molecular weights from about 10,000 to about 100,000 are also useful and have been found to impart viscosity index improving properties to the metal salt compositions of this invention. In many instances, the use of such higher molecular weight olefin polymers is desirable.

The most common sources of these substantially aliphatic hydrocarbon subtituents are the polyolefins such as polyethylene, polypropylene, polyisobutene, etc. A particularly preferred polyolefin is polyisobutene having a molecular weight of about 1,000.

Another method useful for preparing the succinic acids and anhydrides involves the reaction of itaconic acid or anhydride with a high molecular weight olefin or a polar-substituted hydrocarbon at a temperature usually within the range of from about 100° C. to about 200° C.

The amines useful in this invention include alkylene polyamines and hydroxyalkyl-substituted alkylene polyamines.

A preferred source of the amine group consists of alkylene polyamines conforming for the most part to the formula

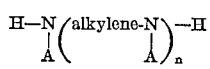

wherein $n$ is an integer preferably less than about 10, A is a hydrocarbon radical, a hydrogen radical, or an amino hydrocarbon radical, and the alkylene radical is preferably a lower alkylene radical having less than about 8 carbon atoms. Specific amines which are contemplated are exemplified by: ethylene diamine, triethylene tetramine, propylene diamine, decamethylene diamine, octamethylene diamine, di(hepta-methylene) triamine, tripropylene tetramine, tetraethylene pentamine, trimethylene diamine, pentaethylene hexamine, di(trimethylene) triamine, 2-heptyl - 3-(2-aminopropyl)imidazoline, 1,3-bis(2-aminoethyl)imidazoline, pyrimidine, 1-(2-aminopropyl) piperazine, 1,4-bis(2-aminoethyl) piperazine, and 2-methyl-1-(2-aminobutyl) piperazine. Higher homologues such as are obtained by condensing two or more of the above-illustrated alkylene amines are likewise useful.

Hydroxyalkyl-substituted alkylene polyamines, i.e., alkylene polyamines having 1 or more hydroxyalkyl substituents on a nitrogen atom, are likewise contemplated for use in this invention. The hydroxyalkyl-substituted alkylene polyamines are preferably those in which the alkyl group is a lower alkyl group, i.e., having less than about 6 carbon atoms. Examples of such amines include N-(2-hydroxyethyl) ethylene diamine, N,N'-bis(2-hydroxyethyl) ethylene diamine, 1-(2-hydroxyethyl) piperazine, monohydroxypropyl diethylene triamine, 1,4-bis (2-hydroxypropyl) piperazine, dihydroxypropyl tetraethylene pentamine, and N-(3-hydroxypropyl) tetramethylene diamine, and 2-heptadecyl-1-(2-hydroxyethyl) imidazoline.

Higher homologues such as are obtained by condensation of the above-illustrated alkylene amines and/or hydroxyalkyl-substituted alkylene amines through amino radicals or through hydroxy radicals are likewise useful. It is noted that condensation through amino radicals results in a higher molecular weight polyamine accompanied by removal of ammonia whereas condensation through the hydroxyl radicals results in products containing ether linkages accompanied by removal of water.

The ethylene polyamines are especially useful in this invention. They are described in detail under the heading "Ethylene Amines" in "Encyclopedia of Chemical Technology," Kirk and Othmer, volume 5, pages 898–905, Interscience Publishers, New York (1950). Such compounds are prepared by the reaction of an alkylene dichloride with ammonia which results in the production of complex mixtures of alkylene polyamines, including cyclic condensation products such as piperazines. These mixtures find use in the processes of this invention. On the other hand, quite satisfactory products may be obtained by the use of pure alkylene polyamines. An especially useful alkylene polyamine, for reasons of economy as well as the effectiveness of the products derived therefrom, is a mixture of ethylene polyamines prepared by the reaction of ethylene dichloride and ammonia and having a composition principally consisting of diethylenetriamine, tetraethylenepentamine, pentaethylenehexamine, higher polyethylene polyamine compounds, cyclic polyethylene polyamine compounds, and having an average nitrogen content of about 34%.

Another especially useful amine for reasons of economy as well as the effectiveness of the products derived therefrom is a mixture of poly(trimethylene) polyamines and the 1,3-trimethylene diamine derived from the reaction of acrolein and ammonia.

The acylated amine is prepared by mixing, at a temperature within the range of from about 50° C. to about 300° C., one equivalent of a succinic compound selected from the class consisting of hydrocarbon-substituted succinic acids and hydrocarbon-substituted succinic anhydrides, wherein the hydrocarbon substituent has at least about 50 aliphatic carbon atoms, with at least about 1.2 equivalents of an amine selected from the class consisting of alkylene polyamines and hydroxyalkyl-substituted alkylene polyamines and removing the water formed thereby. The reaction mixture may contain a solvent, e.g., mineral oil, toluene, high molecular weight alcohols, etc. It is preferred that the mixing be carried out at a temperature within the range of from about 80° C. to about 160° C. and for a period of from about 2 to about 6 hours. It is preferred also that the equivalent ratio of the succinic compound to the amine be 1:2, however, ratios up to 1:5 are also useful. The term "equivalent" is meant to define the number of replaceable —OH groups on the succinic compound and the number of =NH groups per amine compound. During the mixing, it is recommended that an inert gas such as nitrogen be bubbled through the reaction mixture to remove the water which is formed.

The aluminum oxy compounds useful in this invention include those having the formula $$R_xAl(OR)_{3-x}$$

wherein R is a radical having from 2 to about 12 carbon atoms and is selected from the class consisting of alkyl and aryl and $x$ is a number from 0 to 2. The term "alkyl" includes aliphatic and cyclic aliphatic hydrocarbons and aromatic substituted aliphatic and cyclic aliphatic hydrocarbons. "Aryl" includes aromatic hydrocarbons and alkyl and cycloalkyl substituted aromatic hydrocarbons. Examples of such aluminum oxy compounds include aluminum ethoxide, aluminum propoxide, aluminum isopropoxide, aluminum butoxide, aluminum t-butoxide, aluminum hexoxide, aluminum octoxide, aluminum decoxide, aluminum dodecoxide, aluminum phenoxide, aluminum cyclohexyloxide, aluminum benzyloxide, aluminum diethyl ethoxide, aluminum propyl dipropoxide, aluminum diisobutyl isobutoxide, aluminum octyl dioctoxide, and aluminum didodecyl dodecoxide. Aluminum oxy compounds having mixtures of alkyl and aryl as the R radicals are also useful. The aluminum trialkoxides are preferred for this invention.

Processes for preparing aluminum oxy compounds include reacting aluminum metal with an alcohol in the presence of mercuric chloride; reacting a high molecular weight hydroxy compound with a relatively low molecular weight aluminum alkoxide; and oxidation of alkyl, aryl or mixtures of alkyl and aryl aluminum compounds. For example, alkyl aluminum alkoxides can be prepared by reacting aluminum triethyl with ethylene to give the desired molecular weight alkyl aluminum and then oxidizing said alkyl aluminum to the mono-oxide, dioxide, or trioxide. Aluminum alkoxides can also be prepared by reacting an alkyl or aryl aluminum halide with an alcohol.

The nitrogen and aluminum containing compositions are prepared by mixing the acylated amine with at least about 0.6 equivalent of one of the aluminum oxy compounds described above and heating the resulting mixture at a temperature within the range of from about 50° C. to about 300° C.. It is preferred that the mixing be carried out at a temperature within the range of from about 125° C. to about 190° C. over a period of from about 3 to about 10 hours.

The amount of aluminum oxy compound to be added is dependent on the amount of excess amine, i.e., amine which is in excess of the stoichiometric amount required to react with the succinic compound. The equivalent ratio of the excess amine to the aluminum oxy compound should be within the range of from about 0.3:1 to about 10:1, respectively. The preferred equivalent ratio is 2 equivalents of the excess amine to 3 equivalents of the aluminum oxy compound. The equivalents of aluminum oxy compound define the number of "—OR" groups attached to the aluminum.

The nature of the products obtained by the process of this invention is not fully understood. It is known, however, that the products contain nitrogen and aluminum, and that they function as detergent and dispersants and oxidation inhibitors in lubricating oils.

The following examples illustrate the process of this invention (parts are by weight unless otherwise specified):

EXAMPLE 1

A polyisobutenyl succinic anhydride is prepared by the reaction of a chlorinated polyisobutylene (having an average chlorine content of 4.3 weight percent and an average of 69 carbon atoms) with maleic anhydride at about 200° C. The resulting polyisobutenyl succinic anhydride has an acid number of 105. To a mixture of 2,500 parts of mineral oil and 3,410 parts (6.4 equivalents) of the succinic anhydride, there is added, at 121° C., 500 parts (12.8 equivalents) of a polyethylene polyamine obtained from the reaction of ethylene dichloride and ammonia and having an average nitrogen content of about 34 percent. The addition is made over a period of 2 hours. The mixture is then heated to 150° C. and bubbled with nitrogen to remove the water resulting from acylation. To 1,500 parts of the mixture and 518 parts of mineral oil, there is added, at 160° C. and over a period of 1.75 hours, 265 parts (3.9 equivalents) of aluminum isopropoxide. Thereupon, the mixture is maintained at 152°–156° C. for 4.25 hours. The residue is filtered. The filtrate has an aluminum content of 1.2 percent and a nitrogen content of 2.3 percent.

EXAMPLE 2

To a mixture containing 2,500 parts of mineral oil and 3,400 parts (6.4 equivalents) of the polyisobutenyl succinic anhydride described in Example 1, there is added, over a period of 2 hours at 121° C., 500 parts (12.8 equivalents) of the polyethylene polyamine described in Example 1. The mixture is heated to 150°–155° C. and is bubbled with nitrogen at this temperature for 5 hours. To 2,000 parts of the mixture and 730 parts of mineral oil, there is added, at 100° C., 166 parts (2.44 equivalents) of aluminum isopropoxide. The mixture is maintained at 155°–160° C. for 6.5 hours. Thereupon, the mixture is maintained at 190°–215° C./20 mm. for 2.25 hours and the residue is filtered. The filtrate has an aluminum content of 0.68 percent and a nitrogen content of 2.34 percent.

EXAMPLE 3

To a mixture containing 2,500 parts of mineral oil and 3,410 parts (6.1 equivalents) of a polyisobutenyl succinic anhydride (having an acid number of 100 and prepared, as in Example 1, from maleic anhydride and a chlorinated polyisobutylene having an average chlorine content of 4.3 weight percent and an average of 71 carbon atoms), there is added over a period of 2 hours at 121° C., 500 parts (12.2 equivalents) of the polyethylene polyamine described in Example 1. The mixture is then maintained at 149°–155° C. and bubbled, at this temperature, with nitrogen for 5 hours. To 2,403 parts of the reaction mixture and 829 parts of mineral oil, there is added over a period of 1.75 hours at 150° C., 316 parts (4.65 equivalents) of aluminum isopropoxide. Thereupon, the mixture is maintained at 160° C. and bubbled with nitrogen for 4.5 hours. The residue is filtered. The filtrate has an aluminum content of 1.26 percent and a nitrogen content of 2.4 percent.

EXAMPLE 4

To a mixture containing 3,085 parts of mineral oil and 500 parts (12.2 equivalents) of an ethylene polyamine mixture having an average composition corresponding to that of pentaethylene hexamine and having a nitrogen content of about 36%, there is added over a period of 2 hours, at 120° C., 4,530 parts (8.1 equivalents) of the polyisobutenyl succinic anhydride described in Example 3. The reaction mixture is then maintained at 145°–155° C. and bubbled with nitrogen for 5 hours. To 3,329 parts of the mixture, there is added, at 150° C., 176 parts (2.58 equivalents) of aluminum isopropoxide and the mixture is maintained at 150°–160° C. for an additional 4 hours.

The residue is filtered. The filtrate has an aluminum content of 1.4% and a nitrogen content of 1.8%.

EXAMPLE 5

To a mixture containing 3,170 parts of mineral oil and 390 parts (7.2 equivalents) of 2-hydroxyethyl piperazine, there is added over a period of 1 hour, at 100° C., 4,200 parts (6 equivalents) of a polyisobutenyl succinic anhydride (having an acid number of 80 and perpared, as in Example 1, from maleic anhydride and a chlorinated polyisobutylene having an average chlorine content of 4.3 weight percent and an average of 92 carbon atoms). The mixture is maintained at 165°–175° C. and is bubbled with nitrogen for 4 hours. There is then added, at 75° C., 54 parts (1 equivalent) of aluminum ethoxide. The mixture is maintained at 100°–110° C. for 5 hours and is then maintained at 170°–175° C./10 mm. for an additional 1.5 hours. The residue is filtered to give the desired product.

EXAMPLE 6

To a mixture containing 740 parts of mineral oil and 982 parts (2 equivalents) of a polyisobutenyl succinic anhydride (having an acid number of 114 and prepared as an Example 1, from maleic anhydride and a chlorinated polyisobutylene having an average chlorine content of 4.3 weight percent and an average of 62 carbon atoms), there is added over a period of 1.5 hours at 115° C., 302 parts (8 equivalents) of tetraethylene pentamine. The mixture is then maintained at 165°–170° C. and bubbled with nitrogen for 3.5 hours. Thereupon, there is added over a period of 1 hour at 120° C., 493 parts (6 equivalents) of aluminum butoxide. The mixture is then maintained at 150°–165° C. and bubbled with nitrogen for 4 hours. The residue is filtered to give the desired product.

EXAMPLE 7

A polyisobutenyl succinic acid is prepared by the reaction of a chlorinated polyisobutylene (having an average chlorine content of 4.3 weight percent and an average of 153 carbon atoms) with maleic acid at about 200° C. The resulting acid has an acid number of 49.6. To a mixture of 2,256 parts (2 equivalents) of the succinic acid and 1,225 parts of mineral oil, there is added over a period of 2.5 hours, at 175° C., 232 parts (6 equivalents) of pentaethylene hexamine. The mixture is then maintained at 175°–185° C. and bubbled with nitrogen for 6 hours. There is then added over a period of 1 hour at 175° C., 207 parts (1.5 equivalents) of aluminum octoxide. Thereupon, the mixture is maintained at 180°–190° C. and bubbled with nitrogen for 3 hours. The residue is filtered to give the desired product.

EXAMPLE 8

A product is obtained by the procedure of Example 6 except that 576 parts (8 equivalents) of N,N'-bis(2-hydroxyethyl) ethylene diamine is used in lieu of the tetraethylene pentamine and 613 parts (6 equivalents) of aluminum phenoxide is used in lieu of the aluminum butoxide.

EXAMPLE 9

A product is obtained by the procedure of Example 7 except that 388 parts (2 equivalents) of aluminum dodecoxide is used in lieu of aluminum octoxide.

EXAMPLE 10

A product is obtained by the procedure of Example 6 except that 880 parts (8 equivalents) of tripropylene tetramine is used in lieu of tetraethylene pentamine and 738 parts (9 equivalents) of aluminum t-butoxide is used in lieu of aluminum butoxide.

EXAMPLE 11

A product is obtained by the procedure of Example 7 except that 432 parts (4 equivalents) of aluminum cyclohexyloxide is used in lieu of aluminum octoxide.

EXAMPLE 12

A product is obtained by the procedure of Example 3 except that 540 parts (4.65 equivalents) of aluminum benzyloxide is used in lieu of aluminum isopropoxide.

EXAMPLE 13

A product is obtained by the procedure of Example 6 except that 612 parts (6 equivalents) of aluminum phenoxide is used in lieu of aluminum butoxide.

EXAMPLE 14

A product is obtained by the procedure of Example 6 except that 1,284 parts (6 equivalents) of aluminum diisobutyl isobutoxide is used in lieu of aluminum butoxide.

EXAMPLE 15

A product is obtained by the procedure of Example 3 except that 1,194 parts (6 equivalents) of aluminum octyl dioctoxide is used in lieu of aluminum isopropoxide.

To be effective as detergents and dispersants, the compositions of this invention are usually present in lubricating oils in amounts ranging from about 0.3% to about 18% by weight. The optimum amount of said composition depends to a large extent upon the type of service to which the lubricating composition is to be subjected. For example, lubricating compositions for use in gasoline internal combustion engines may contain from about 0.5% to about 4% by weight of the products of the invention whereas lubricating compositions for use in diesel engines may contain 15% or even more of the additive.

This invention contemplates also the use of other additives with the products of this invention in lubricating compositions. Such additives include for example, detergents and dispersants of the ash-containing type, detergents and dispersants of the ashless-containing type, oxidation inhibiting agents, corrosion inhibiting agents, viscosity index improving agents, pour point depressing agents, extreme pressure agents, color stabilizers and antifoam agents.

Examples of ash-containing detergents and dispersants include the Group I and Group II metal salts of sulfonic acids, carboxylic acids, phosphorus acids, etc. Overbased metal salt products are also contemplated. These over-based products can be obtained by reacting an acid and a basic metal compound in the presence of a promoter (phenolic type compounds) and then reacting, in the presence of a lower alcohol or water, the basic metal compound with an acidic gas (carbon dioxide, hydrogen sulfide, etc.).

The ashless-containing detergents and dispersants include products obtained from the reaction of hydrocarbon substituted succinic compounds with alkylene polyamines. The products can be further reacted with boric acid, metal compounds, etc.

The extreme pressure agents and oxidation and corrosion inhibitors which are useful in the lubricants of the invention are exemplified by the chlorinated aliphatic hydrocarbons, organic sulfides and polysulfides, phosphorosulfurized hydrocarbons, phosphorus esters including dihydrocarbon and trihydrocarbon phosphites, metal thiocarbamates, metal phosphorodithioates, metal phosphinodithioates, metal phosphoromonothioates, metal phospinates, etc.

Examples of pour point depressing agents include polymers of ethylene, propylene, isobutene, and poly-(alkylmethacrylates). Anti-foam agents include polymeric alkyl siloxanes, poly-(alkylmethacrylates), and the condensation products of alkylphenol with formaldehyde and an amine.

The following examples are illustrative of lubricating compositions containing products of the process of this invention (all parts are by weight).

Lubricant A

| | |
|---|---:|
| SAE 20 mineral lubricating oil | 96.05 |
| Product of Example 1 | 3.16 |
| Zinc salt of phosphorodithioic acid prepared by the reaction of phosphorus pentasulfide with a mixture of 65% (mole) of isobutyl alcohol and 35% (mole) of mixed primary-amyl alcohols | 0.79 |
| Poly-(alkyl siloxane) anti-foam agent | 0.003 |

Lubricant B

| | |
|---|---:|
| SAE 30 mineral lubricating oil | 96.27 |
| Product of Example 3 | 2.94 |
| Zinc salt of Lubricant A | 0.79 |
| Poly-(alkyl siloxane) anti-foam agent | 0.003 |

Lubricant C

| | |
|---|---:|
| SAE 30 mineral lubricating oil | 94.2 |
| Product of Example 5 | 5.8 |

Lubricant D

| | |
|---|---:|
| SAE 20 mineral lubricating oil | 84.7 |
| Product of Example 7 | 15.3 |

Lubricant E

| | |
|---|---:|
| SAE 30 mineral lubricating oil | 89.65 |
| Product of Example 9 | 3.11 |
| Over-based calcium sulfonate obtained by carbonating a mineral oil mixture of calcium polydodecyl-benzene sulfonate and an excess of calcium hydroxide in the presence of an aqueous alcohol | 1.84 |
| Zinc salt of Lubricant A | 0.67 |
| Poly-(alkyl siloxane) anti-foam agent | 0.003 |

Lubricant F

| | |
|---|---:|
| SAE 20 mineral lubricating oil | 87.04 |
| Product of Example 10 | 5.28 |
| Copolymer of an alkyl methacrylate and N-vinyl pyrrolidone | 5.0 |
| Calcium salt obtained from the condensation of heptylphenol, calcium hydroxide and paraformaldehyde carried out in the presence of a basic mineral oil solution | 1.32 |
| Zinc salt of Lubricant A | 0.73 |
| Over-based calcium salt obtained by carbonating, in the presence of water and alcohol, a mineral oil mixture of a calcium petroleum sulfonate and an excess of calcium hydroxide | 0.58 |
| Poly-(alkyl siloxane) anti-foam agent | 0.003 |

Lubricant G

| | |
|---|---:|
| SAE 30 mineral lubricating oil | 96.71 |
| Product of Example 13 | 1.7 |
| Over-based barium salt obtained by carbonating, in the presence of heptyl phenol, a mineral oil mixture of a hydrolyzed polyisobutylene substituted phosphinodithioic acid and barium oxide | 0.80 |
| Zinc salt of phosphorodithioic acid obtained by reacting phosphorus pentasulfide and a mixture of 60% (mole) methyl amyl alcohol and 40% (mole) isopropyl alcohol | 0.79 |
| Poly-(alkyl siloxane) anti-foam agent | 0.002 |

The above lubricating compositions are merely illustrative of lubricating compositions containing the products of this invention. The scope of the present invention is not to be considered as limited by the above examples but is intended to include the use of all of the additives previously illustrated as well as others within the broad concept of the invention described herein.

The utility of the products of the invention as dispersant additives is shown by the results and evaluation of a modified version of the CRC–EX–3 engine test. Ordinarily this engine test lasts for 96 hours, however, the modified version lasts for 144 hours. This test is recognized in the lubricating field as an important test by which lubricants can be evaluated for use under light duty service conditions. In this particular test, a lubricant is used in the crankcase of a 1954, 6-cylinder Chevrolet Powerglide engine for 144 hours under the following recurring cycling conditions: (A) 2 hours at an engine speed of 500±25 r.p.m. under 0 load at an oil sump temperature of 100°–125° F., and an air-fuel ratio of 10:1; (B) 2 hours at an engine speed of 2500±25 r.p.m. under a load of 40 brake-horsepower at an oil sump temperature of 160°–170° F., and an air-fuel ratio of 16:1; (C) 2 hours at an engine speed of 2500±25 r.p.m. under a load of 40 brake-horsepower at an oil sump temperature of 240°–250° F., and an air-fuel ratio of 16:1. At the end of the test, the engine is dismantled and inspected for sludge and varnish in accordance with the CRC deposit rating system. The rating is based on (1) the extent of piston ring-filling (percent basis), (2) the amount of sludge formed in the engine (on a scale of 80–0, 80 being indicative of no sludge and 0 being indicative of extremely heavy sludge), and (3) the total number of engine deposit, i.e., sludge and varnish, formed in the engine (on a scale of 100–0, 100 being indicative of no deposit and 0 being indicative of extremely heavy deposits). The utility of the product of the invention as a dispersant is shown by subjecting Lubricant A to the above dispersancy test. The results are shown in Table I.

TABLE I.—MODIFIED CRC–EX–3 ENGINE TEST

| Type of rating: | Rating, percent |
|---|---:|
| (1) Piston ring-filling | 2 |
| (2) Sludge | 77.5 |
| (3) Total engine deposits | 97.4 |

The utility of the products of this invention as detergents is shown by subjecting a lubricant containing such a product to a test in which a 5¾" bore single cylinder Caterpillar Diesel Test Engine is operated at a constant speed and B.t.u. input. This test is recognized in the field as a severe diesel test to determine the effect of an engine oil on ring sticking, wear, and the accumulation of piston deposits in a 480-hour endurance run. This test is different from the normal diesel test in that the fuel has a higher sulfur content. In this 480-hour endurance test, the engine oil is changed at 120-hour intervals. The conditions of the testing operation are as follows:

| | |
|---|---|
| Speed | 1000±5 r.p.m. |
| Load | Approx. 80 lbs. (20 B.H.P.). |
| Fuel (1.0% sulfur) | 2,975±25 B.t.u./min., 0.15 lbs./min. |
| Oil pressure | 30±1 p.s.i. |
| Oil sump temperature | 145°–150° F. |
| Water-out temperature | 175°–180° F. |

The piston is evaluated at 120-hour intervals for (1) percent top groove filling and (2) deposits on lands, grooves, groove sides, ring side, skirt, crown, and under the piston crown (on a scale of 100–0, 100 being indicative of no deposits and 0 being indicative of extremely heavy deposits). The results obtained when Lubricant B is subjected to this test are summarized in Table II.

TABLE II.—CATERPILLAR DIESEL TEST

| Type of Rating | Rating Time Interval (hours) | | | |
|---|---|---|---|---|
| | 120 | 240 | 260 | 480 |
| (1) Top groove filling (percent) | 3 | 3 | 4 | 5 |
| (2) Total deposits | 96 | 96 | 96 | 92.5 |

To illustrate still further the utility of the products of the process of this invention, an oxidation and detergency test is run. A 350-cc. sample of a lubricant containing 1.5% by weight of the solvent-free additive to be tested is placed in a 2 x 15 (inches) borosilicate tube. A 1⅜ x 5⅞ (inches) SAE 1020 steel panel is immersed in the sample. Thereupon, the sample is oxidized by maintaining it for 96 hours at 300° F. and bubbling air at 10 liters per hour through the sample. The oxidized sample is then cooled to 120° F., homogenized with 0.5% of water and allowed to stand at room temperature for 24 hours. Thereupon, the sample is filtered through two layers of No. 1 Whatman filter paper at 20 mm. Hg pressure. The precipitate is washed with naphtha, dried and weighed. The resulting weight is taken as a measure of the effectiveness of the additive to inhibit oxidation and to disperse the sludge formed during the test. The greater the weight of the precipitate the less effective the additive. The base oil of the lubricant sample used in this test is a Mid-Continent, conventionally refined mineral oil having a viscosity of about 180 SUS at 100° F. The results of the test are indicated in the following table (Table III):

TABLE III.—OXIDATION AND DETERGENCY TEST

| Lubricant containing product of example: | Sludge (mg. per 100 cc. of sample) |
|---|---|
| None | 800–1,200 |
| 1 | 214 |
| 3 | 27 |
| 4 | 10 |

What is claimed is:
1. An oil-soluble nitrogen and aluminum containing composition prepared by the process comprising
   (A) preparing an acylated amine by mixing, at a temperature within the range of from about 50° C. to about 300° C.,
      (1) one equivalent of a succinic compound selected from the class consisting of hydrocarbon-substituted succinic acids and hydrocarbon-substituted succinic anhydrides wherein the hydrocarbon substituent has at least about 50 aliphatic carbon atoms, with
      (2) at least about 1.2 equivalents of an amine selected from the class consisting of alkylene polyamines and hydroxy alkyl-substituted alkylene polyamines,
   and removing the water formed thereby, and then
   (B) mixing the acylated amine with at least about 0.6 equivalent of an aluminum oxy compound having the structural formula

$$R_xAl(OR)_{3-x}$$

wherein R is a radical having from about 2 to about 12 carbon atoms and is selected from the class consisting of alkyl and aryl and $x$ is a number from 0 to 2, and heating the resultant mixture at a temperature within the range of from about 50° C. to about 300° C.

2. The composition of claim 1 wherein the hydrocarbon substituent of the succinic compound is a radical derived from a polyisobutene having a molecular weight within the range of from about 700 to about 50,000.

3. The composition of claim 1 wherein the amine is an alkylene polyamine.

4. The composition of claim 1 wherein the aluminum oxy compound has the structural formula Al(OR)₃ and R is a radical having from about 2 to about 12 carbon atoms.

5. An oil-soluble nitrogen and aluminum containing composition prepared by the process comprising
   (A) preparing an acylated amine by mixing, at a temperature within the range of from about 50° C. to about 300° C.,
      (1) one equivalent of a hydrocarbon-substituted succinic anhydride wherein the hydrocarbon substituent has at least about 50 aliphatic carbon atoms, with
      (2) from about 1.5 to about 5 equivalents of an alkylene polyamine, and
   removing the water formed thereby, and then
   (B) mixing the acylated amine with from about 0.75 to about 10 equivalents of an aluminum oxy compound having the structural formula Al(OR)₃ wherein R is alkyl having from about 2 to about 12 carbon atoms, and heating the resulting mixture at a temperature within the range of from about 50° C. to about 300° C.

6. The composition of claim 5 wherein the hydrocarbon substituent of the succinic anhydride contains about 70 aliphatic carbon atoms.

7. The composition of claim 5 wherein the alkylene polyamine is an ethylene polyamine.

8. The composition of claim 5 wherein the aluminum oxy compound is aluminum isopropoxide.

9. The composition of claim 7 wherein the ethylene polyamine is pentaethylene hexamine.

10. The composition of claim 7 wherein the ethylene polyamide is diethylene triamine.

11. An oil-soluble nitrogen and aluminum containing composition prepared by the process comprising
    (A) preparing an acylated amine by mixing, at a temperature within the range of from about 50° C. to about 300° C.,
       (1) one equivalent of a polyisobutenyl-substituted succinic anhydride wherein the hydrocarbon substituent has about 70 aliphatic carbon atoms, with
       (2) 2 equivalents of pentaethylene hexamine, and
    removing the water formed thereby, and then
    (B) mixing the acylated amine with 1.5 equivalents of aluminum isopropoxide and heating the resulting mixture at a temperature within the range of from about 50° C. to about 300° C.

12. An oil-soluble nitrogen and aluminum containing composition prepared by the process comprising
    (A) preparing an acylated amine by mixing, at a temperature within the range of from about 50° C. to about 300° C.,
       (1) one equivalent of a polyisobutenyl-substituted succinic anhydride wherein the hydrocarbon substituent has about 150 aliphatic carbon atoms, with
       (2) 2 equivalents of tetraethylene pentamine, and
    removing the water formed thereby, and then
    (B) mixing the acylated amine with 1.5 equivalents of aluminum isopropoxide and heating the resulting mixture at a temperature within the range of from about 50° C. to about 300° C.

13. A lubricating composition comprising a major proportion of a lubricating oil and from about 0.3% to about 18% by weight of the product of the composition of claim 1.

14. A lubricating composition comprising a major proportion of a lubricating oil and from about 0.3% to about 18% by weight of the product of the composition of claim 11.

References Cited by the Examiner

UNITED STATES PATENTS

| 2,985,685 | 5/1961 | Thomas et al. | 260—448 |
| 3,087,936 | 4/1963 | Le Suer | 252—51.5 X |
| 3,163,603 | 12/1964 | Le Suer | 252—33.6 |

DANIEL E. WYMAN, *Primary Examiner.*

C. F. DEES, *Assistant Examiner.*